United States Patent [19]
Yoshida et al.

[11] Patent Number: 5,963,442
[45] Date of Patent: Oct. 5, 1999

[54] INVERTER SYSTEM FOR DRIVING MOTOR

[75] Inventors: Makoto Yoshida; Naomi Goto, both of Shiga, Japan

[73] Assignee: Matsushita Electric Industrial Co., Ltd., Osaka, Japan

[21] Appl. No.: 09/221,053

[22] Filed: Dec. 28, 1998

[30] Foreign Application Priority Data

Dec. 26, 1997 [JP] Japan ..................................... 9-359617

[51] Int. Cl.⁶ ..................... H02M 7/44; H02M 7/5387; H02P 7/42
[52] U.S. Cl. ..................... 363/98; 363/132; 318/801
[58] Field of Search ................................ 363/17, 98, 132; 318/801, 802, 807, 812; 361/22, 23, 25

[56] References Cited

U.S. PATENT DOCUMENTS

| | | | |
|---|---|---|---|
| 5,209,075 | 5/1993 | Kim | 62/126 |
| 5,371,645 | 12/1994 | Mochizuki | 361/22 |
| 5,519,301 | 5/1996 | Yoshida et al. | 318/811 |
| 5,663,627 | 9/1997 | Ogawa | 363/132 |
| 5,712,540 | 1/1998 | Toda et al. | 318/46 |

FOREIGN PATENT DOCUMENTS 8-48140  2/1996  Japan .

OTHER PUBLICATIONS

"3–Phase Bridge Driver", IR2132, Data Sheet, No. PD–6.033A, International Rectifier, May 1995.

Primary Examiner—Matthew Nguyen
Attorney, Agent, or Firm—Ratner & Prestia

[57] ABSTRACT

An inventor system in which a first power supply system powers: a switching-element-group driving a motor, a charging-pump-type gate-driving-circuit, an inverter controller. A second power supply system powers an air conditioning controller outside of the inverter. An insulating communication circuit provides communication between the inverter controller and the air conditioning controller insulating these two controller. Most parts of the inverter system are powered by a single power supply system, i.e. the first power supply system, whereby electromagnetic noises are reduced, spaces involved in insulation can be saved, and the amount of wiring as well as cost is reduced.

20 Claims, 13 Drawing Sheets

INVERTER SYSTEM FOR DRIVING MOTOR

FIELD OF THE INVENTION

The present invention generally relates to an inverter system for driving a motor. More particularly it relates to an air-conditioning inverter system that drives a compressor incorporating a motor (hereinafter called "compressor"), which fits into a home-use or an office-use air conditioner, or can be mounted in an electric vehicle or a hybrid car (fueled by gasoline and battery.)

BACKGROUND OF THE INVENTION

Figure 11:
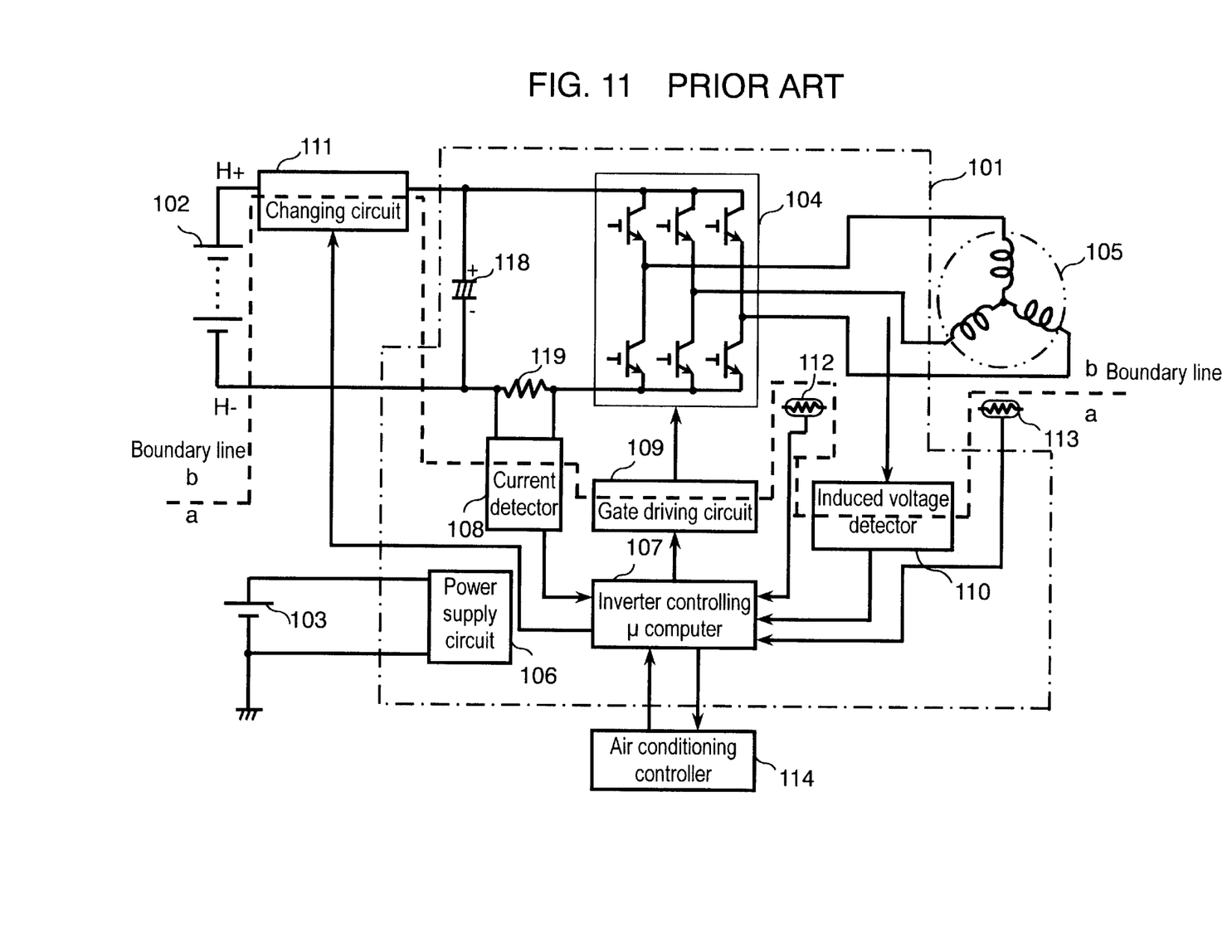
FIG. 11 is a schematic diagram of a conventional air conditioning inverter system.

FIG. 11 illustrates a conventional type inverter system for the air conditioner mentioned above. Specifically, FIG. 11 shows a structure of an air-conditioning inverter system mounted to an electric vehicle.

In FIG. 11, an inverter 101 is supplied power through two routes, one is from a main battery 102 and another is from a sub battery 103, both the batteries power an electric vehicle. Main battery 102 outputs ca. 250V to power a is driving system that may consume relatively a large amount of power.

Main battery 102 powers an air-conditioning compressor 105 via switching elements 104, and may also powers a motor for driving the vehicle.

Sub battery 103 outputs ca. 12V to power a control system for inverter 101 in general. Sub battery 103 may also power other loads consuming relatively little power, such as headlights, a fan motor, and/or windshield wipers and the like.

Typically, main battery 102 and the sub battery 103 are insulated when mounted in an electric vehicle and a hybrid car, and a negative terminal of sub battery 103 is grounded to the car body.

Included in inverter 101, the following elements on side (a) and enclosed by a broken line are supplied power by sub battery 103 (e.g. 12V power supply):

current detector 108, gate drive circuit 109, inverter temperature detector 112, induced voltage detector 110, inverter control microcomputer 107, and power circuit 106.

Power supply circuit 106 produces, for example, 5V to power microcomputer 107 and other ICs integrated circuits by means of, for example, the 12V supplied from sub battery 103. Aside from inverter 101, sub battery 103 may also power charging circuit 111 and compressor temperature detector 113.

Each element lying on the boundary between side (a) and side (b), on the broken line in FIG. 11, such as, for example, charging circuit 111, may be supplied power from both power supply systems in order to function properly. In other words, high voltage power from main battery 102 and low voltage power from sub battery 103 may supply elements lying on the broken line between side (a) and side (b) in FIG. 11. The "power supply system" may be defined as "a power source environment including a first power supply and other power supplies connected to one of the positive or negative terminals of the first power supply."

An air-conditioning controller 114 is supported, for example, by 12V from sub battery 103. Air conditioning controller 114 determines a desirable rotating speed of compressor 105 based on information supplied from occupants of a car and various sensors including an in-car temperature detector, and sends an instruction value associated with a rotating speed to inverter 101. Microcomputer 107 included in inverter 101 receives the instruction value, and sends a control signal to gate drive circuit 109 causing compressor 105 to run at a desirable speed. Based on the control signal, gate drive circuit 109 controls an ON/OFF state of plural insulated-gate-type bipolar-transistors (hereinafter called IGBT) that comprise switching elements 104. A waveform of voltage supplied to compressor 105 is a three-phase pulse width modulation (hereinafter called PMW voltage.

An example of the conventional air-conditioning inverter system described above is disclosed in the Japanese Patent Application Unexamined Publication No. H08-48140.

Figure 12:
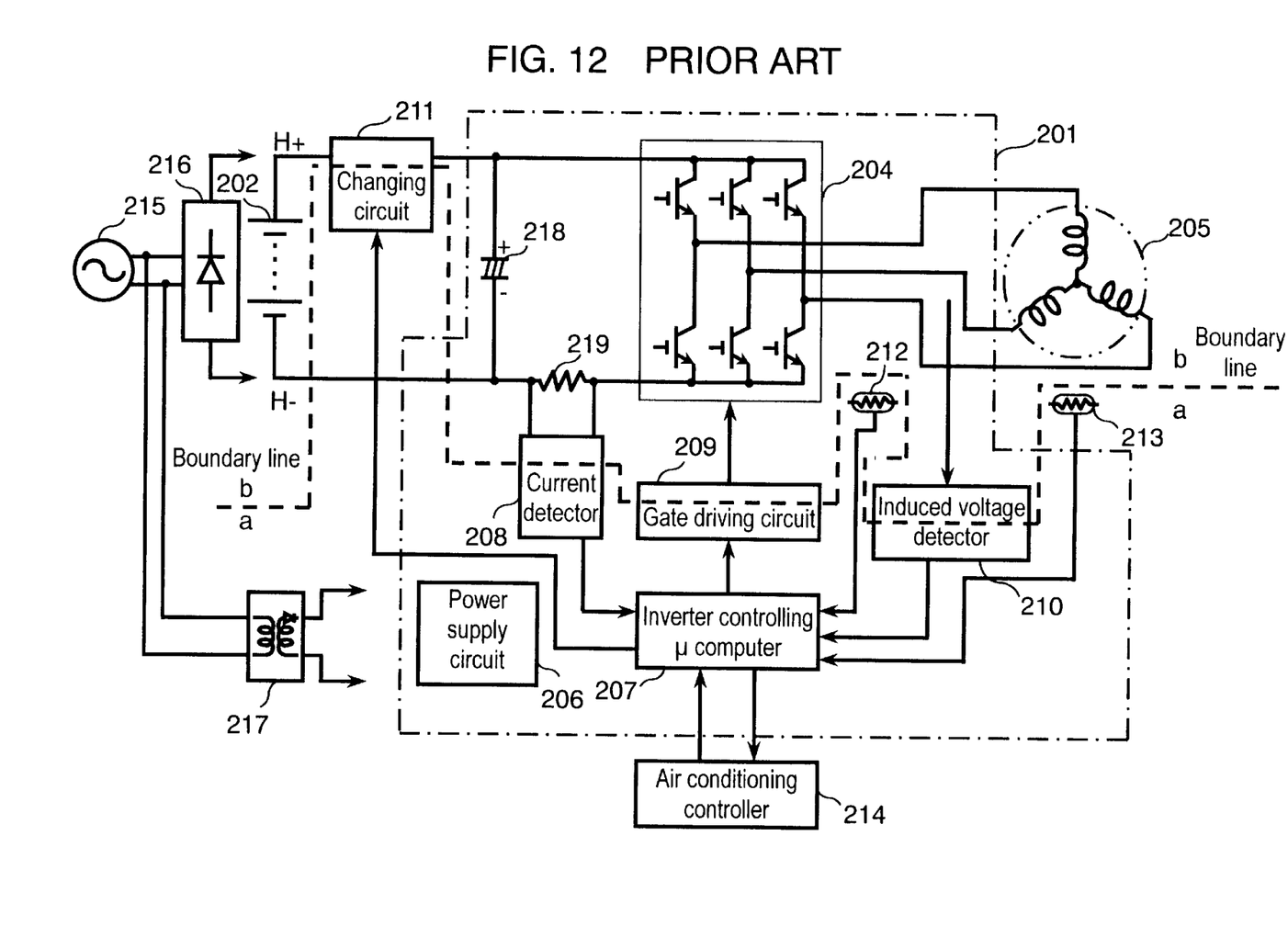
FIG. 12 is a schematic diagram of another conventional air conditioning inverter system.

FIG. 12 illustrates a structure of another conventional inverter system, i.e. an air-conditioning inverter system incorporated in a home-use air conditioner. In the case of the home-use air-conditioner, power may be supplied from commercial power supply 215, e.g. single phase 100V. This power supply may be only available as a first power supply. The ac voltage of commercial power supply 215 may be rectified with rectifier diode 216 into a dc voltage, which may be supplied to compressor 205 via switching elements 204.

Power supply 215 may be insulated and its voltage reduced by isolation transformer 217. The resultant secondary insulated dc voltage may be supplied to air-conditioning controller 214 and charging circuit 211. The secondary insulated dc voltage may also be supplied to inverter 201 thereby producing, for example, a 5V power supply for a control system by means of power circuit 206. Power circuit 206 is thus typically incorporated into inverter 201. Such a 5V power supply may power inverter control microcomputer 207, current detector 208, gate drive circuit 209, and induced voltage detector 210. Charging circuit 211, current detector 208, gate drive circuit 209, and induced voltage detector 210 may be supplied power from two routes. In other words, some system components may receive a high voltage from power supply 202, and a low voltage from power supply circuit 206 and/or secondary insulated dc power 217.

Figure 13:
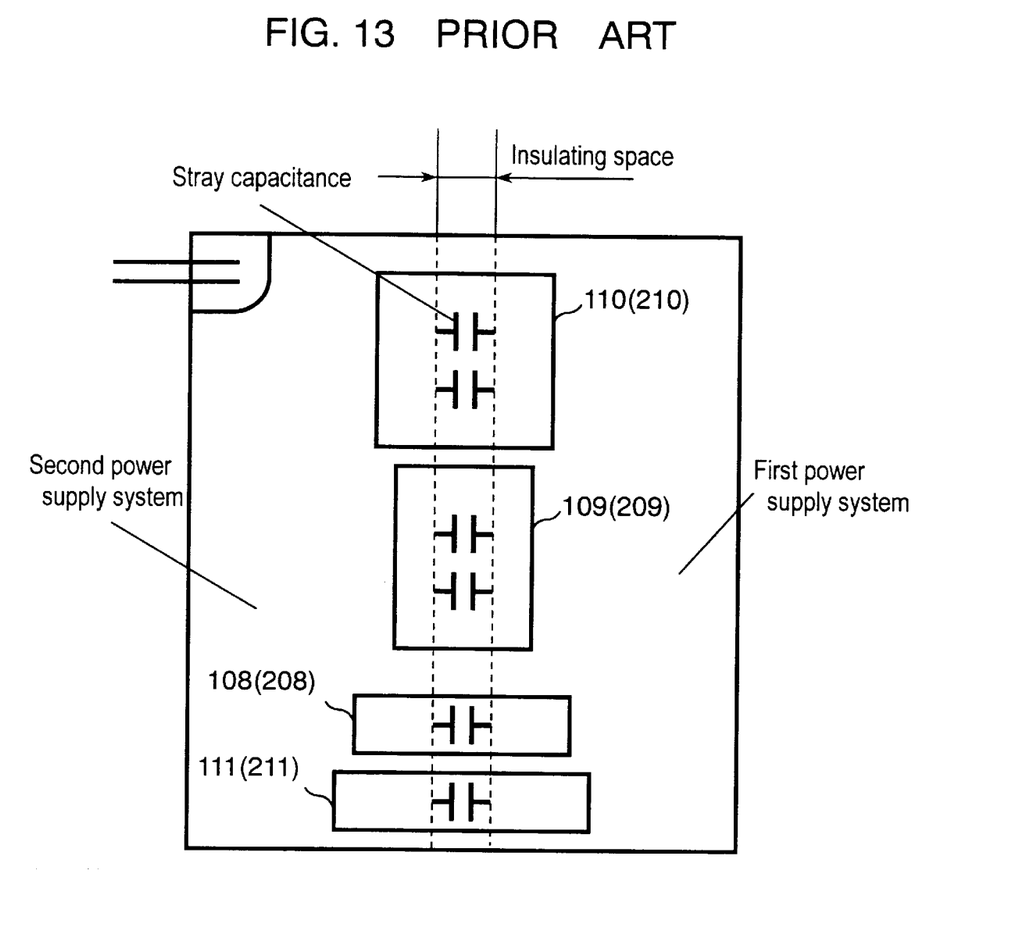
FIG. 13 is a schematic diagram of a PWA of the inverter used in the conventional inverter systems of FIG. 11 and FIG. 12.

FIG. 13 is a schematic diagram of a printed wired assembly board (hereinafter called PWA) of the conventional inverter. There are two circuit families, a first circuit-family may be driven by a main battery, for example, 102 or 202, and a second circuit-family may be driven by sub battery 103 or isolation 25 transformer 217.

Figure 14:
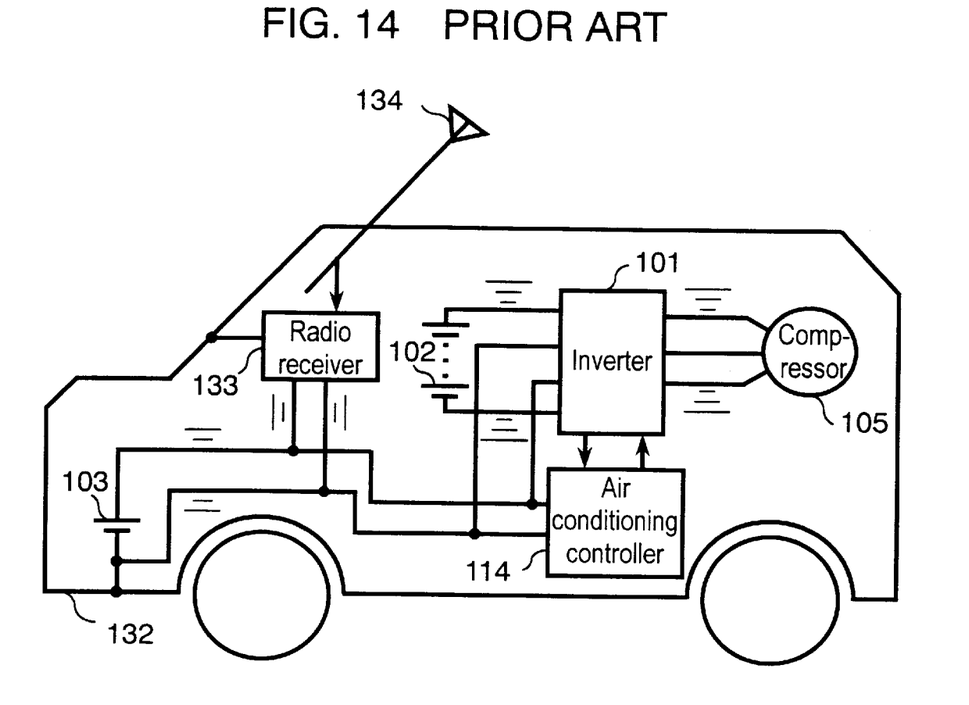
FIG. 14 is a schematic diagram illustrating the conventional air conditioning inverter system shown in FIG. 11 mounted in an electric vehicle.

FIG. 14 is a schematic diagram illustrating a conventional air-conditioning inverter system, such as the system shown in FIG. 11, that is mounted in an electric vehicle.

These conventional air-conditioning inverter systems, however, have a few drawbacks as follows.

First, two power supply systems are connected to inverter 101 or 201, which increase wiring.

Second, as two power supply systems that should be insulated from each other are connected to inverter 101 or 201, each member of the circuit families, which is driven by at least one of the two power supplies, needs an insulating space. Further, some circuit blocks that are driven by the two power supplies may need creepage distances (margin) on the PWA in addition to the insulating spaces within each block. These circuit blocks include components 108, 109, 110 and 111, or 208, 209, 210, and 211. As a result, the inverter system becomes larger, and insulation demands may increase the cost.

The inverter temperature detector, incorporated in the inverter, and the compressor temperature detector, i.e. detectors 112, 113 in FIG. 11 and 212, 213 in FIG. 12, should be insulated from the detecting targets per se such as the motor built in the compressor and switching elements. This also requires space due to insulation demands and may increase the cost. Further, in order to retain the insulation, it maybe better to place these detectors away from the detecting targets, i.e. the motor and switching elements, whereby a detection error may increase.

Third, the two circuit-families are insulated from each other, however, stray capacitances, as shown in FIG. 13, may exist between the two circuit-families.

These stray capacitances permit noise produced by switching, which is a noise source in the AM band, to be led from the first power supply system (high voltage driving system) to the second power supply system (low voltage driving system). The noise may also be easily transmitted outside the inverter. In addition, clock noise due to the operation of the inverter controlling microcomputer, which is a noise source in the FM band, are led from the second power supply system to the first power supply system. This noise may also be easily transmitted outside the inverter. The power lines are thus subjected to these noises and may radiate radiation noise interfering with the radio receiver and its antenna.

SUMMARY OF THE INVENTION

The present invention addresses the above problems and aims to provide an inverter system having less wirings, less electromagnetic noises, and being inexpensive as well as small in size.

An inverter system comprises: a first power supply, a motor, a plurality of switching elements, a gate-driving circuit, an inverter controller, a second power supply, and an insulating communication circuit. The first power supply has a positive side and a negative side. The plurality of switching elements include: a first switching element, coupled to the positive side of the first power supply, forming a positive side arm; and a second switching element, coupled to the negative side of the first power supply, forming a negative side arm. The gate-driving circuit is supported by the first power supply. The gate-driving circuit selectively drives one of the positive side arm and the negative side arm responsive to a control signal. The inverter controller is supported by the first power supply. The inverter controller controls the motor via the control signal. The outer controller is supported by the second power supply. The insulating communication circuit provides for communication between the inverter controller and the outer controller.

According to the above structure, all the circuits in the inverter except the insulating communication circuit are supported by the first power supply system. Therefore, the inverter may not require a second power supply, whereby the amount of wiring may be reduced. Further, interference due to electromagnetic noises can be also reduced between the first and second power supply systems. As a result, an air-conditioner and a vehicle system on which an inverter system is mounted are subjected to less electromagnetic noises.

According to another aspect of the present invention the secondary power system is a secondary insulated power supply derived from the first power supply.

According to the above construction, all the circuits in the inverter except the insulating communication circuit are supported by the first power supply system. Therefore, spaces for insulating the first and second power supply systems may be saved, and the cost may be reduced.

DESCRIPTION OF THE PREFERRED EMBODIMENTS

Exemplary embodiments of the present invention are described below with reference to the accompanying drawings.

(Exemplary Embodiment 1)

Figure 1:
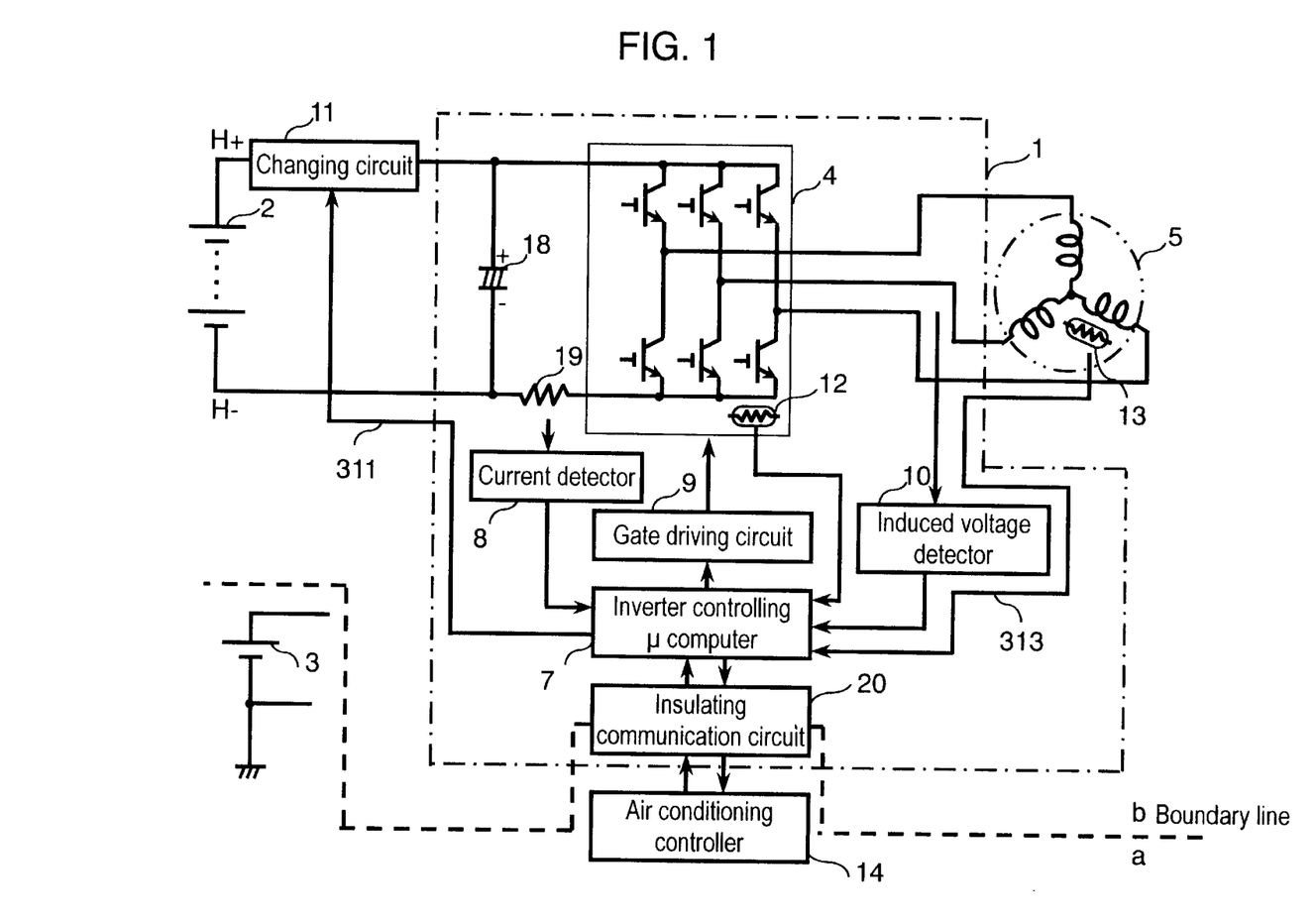
FIG. 1 is a schematic diagram of an inverter system in accordance with a first exemplary embodiment of the present invention.

FIG. 1 is a schematic diagram of an inverter system in accordance with a first exemplary embodiment of the present invention. This inverter system may be used in an air-conditioner mounted in an electric vehicle.

This inverter system comprises the following elements:
compressor 5 incorporating a motor;
inverter 1 which drives compressor 5 in a refrigerating cycle;
air conditioning controller 14 which is an outer controller sending a control signal to inverter 1 for controlling compressor 5;

main battery 2;
sub battery 3; and
charging circuit 11.

The system shown in FIG. 1 differs from the system shown in FIG. 11 as follows. Inverter 1 is supported by main battery 2. In order to effect this difference, charging-pump-type gate driving-circuit 9 is employed so that insulation is saved between inverter controlling microcomputer 7 and switching-element-group 4.

Figure 15:
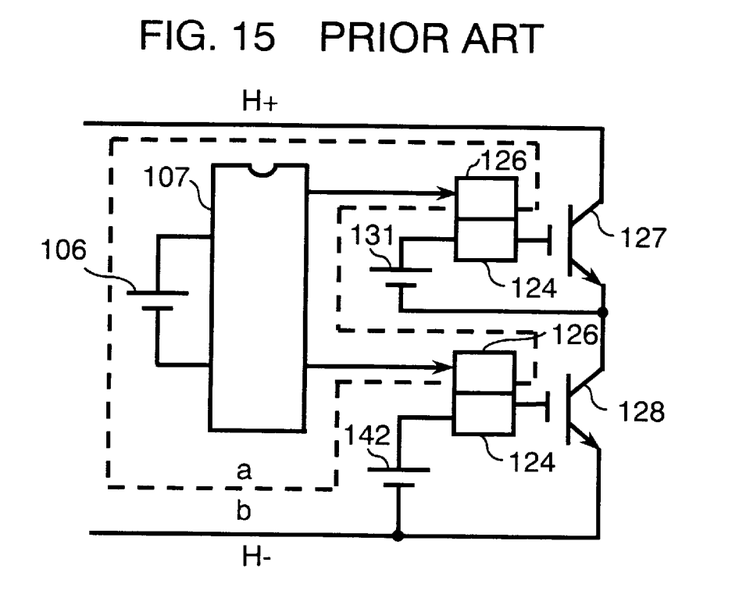
FIG. 15 shows a circuit diagram of a charging-pump-type gate-driving circuit used in the system shown in FIG. 11.

Charging-pump-type gate-driving-circuit 9 according to the present invention is described hereinafter with reference to FIG. 4. The difference from a conventional gate-driving-circuit (e.g. 109 in FIG. 11) is also described with reference to FIG. 4 (a circuit diagram of one block of gate-driving circuit 9). FIG. 15 is also a circuit diagram of one block of conventional gate-driving-circuit 109.

Switching-element-group 4 comprises three IGBTs which may implement a positive side arm, and another three IGBTs implementing a negative side arm. Both groups of three IGBTs may be connected to each coil of three phase motor which is included in compressor 5, as shown in FIG. 1. In FIG. 4, one IGBT 27 of the three IGBTs of the positive side arm and another IGBT 28 of the negative side arm are representatively shown.

Responsive to a control signal from inverter controlling $\mu$ computer 7, gate driving circuit 9 may drive one of three IGBTs forming the positive side arm and one of another three IGBTs forming the negative side arm. By driving these IGBTs gate driving circuit 9 may control the application of the line voltage of a first power supply to the motor coil. As shown, for example, in FIG. 4, the IGBTs may be controlled such that IGBT 27 and IGBT 28 (i.e. a pair of IGBTs in which the emitter an IGBT of the positive side arm is connected to the collector of an IGBT of the negative side arm) may desirably not be activated simultaneously.

Figure 4:
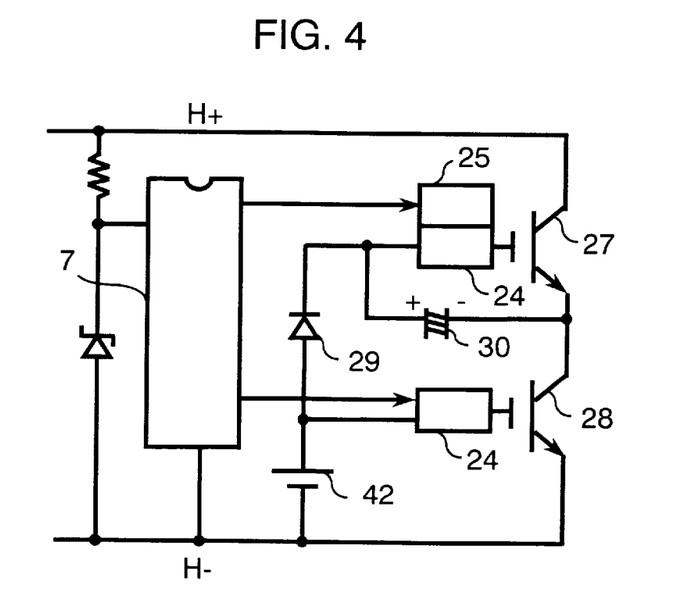
FIG. 4 shows a circuit diagram of a charging-pump-type gate-driving circuit used in the first exemplary embodiment of the present invention. 15

In FIG. 4, the power of inverter controlling microcomputer 7 (hereinafter called "$\mu$ computer") may be supplied by a potential difference between H+ and H−, i.e. a positive terminal of main battery 2 (H+) and a negative terminal of main battery 2 (H−); where main battery 2 is called a first power supply. As the positive terminal may output as high as ca. DC250V, it may be divided by a series circuit comprising a resistor and a zener diode, whereby ca. 5V which may be supplied from a terminal of zener diode may then be applied to $\mu$ computer 7.

The $\mu$ computer 7 may output a signal to the gates of IGBTs 27 and 28 via gate-driving-circuit 9, so that the IGBTs 27 and 28 may be activated (i.e. turned ON/OFF). Gate driving power supply 42, a child power supplies, may be a dc power supply having a negative terminal coupled to the negative terminal of main battery 2. This dc power supply may be produced within inverter 1 by using main battery 2. Two amplifiers 24 may convert the control signal supplied by $\mu$ computer 7 into a driving signal in order to activate IGBTs 27 and 28. For instance, a semiconductor switching circuit 25 able to withstand a high voltage and comprising a MOS-FET circuit may transmit a positive side control signal supplied from $\mu$ computer 7 to amplifier 24 on the positive side. A positive terminal of gate-driving-power-supply 42 may be coupled to a positive side amplifier 24 via diode 29 as well as an emitter of IGBT 27 and a collector of IGBT 28 via capacitor 30.

Next, the operation of charging-pump-type gate-driving-circuit 9 is described. First, negative side IGBT 28 may be driven by the ON-OFF control signal supplied from $\mu$ computer 7. For instance, a [5V, 0V] control signal from $\mu$ computer 7 may be converted by a negative side amplifier 24 into, for example [15V, 0V] which are the on-off levels of IGBT 28. Next, while the IGBT 28 is in an ON state, current flows from the positive side of power supply 42 via diode 29 to capacitor 30, IGBT 28, and the negative terminal of power supply 42, thereby charging capacitor 30. One charged capacitor 30 may function as a power supply that applies a voltage to positive side amplifier 24. The on-off control signal supplied from $\mu$ computer 7, (e.g. a [5V, 0V] signal), may be converted by semiconductor-switching-circuit 25 as well as by positive side amplifier 24 into a [15V, 0V] signal which is a reference voltage based on the emitter of IGBT 27, thereby driving IGBT 27.

In conventional gate-driving-circuit 109 shown in FIG. 15, a power supply of computer 107 is supported by power supply 106 which is in a different circuit-family from the circuit family belonging to main battery 2. $\mu$ computer 107 outputs an on-off control signal via gate-driving-circuit 109 to the gates of IGBTs 127 and 128, activating IGBTs 127 and 128. Gate-driving-power-supply 142 may be a dc power supply having the negative terminal coupled to a negative terminal of main battery 102. Two amplifiers 124 convert a control signal from $\mu$ computer 107 into a driving signal in order to turn-on or turn-off IGBTs 127 and 128.

A positive side photo coupler 126 transmits a positive side control signal supplied from $\mu$ computer 107 to a positive side amplifier 124. A negative side photo coupler 126 transmits a negative side control signal to a negative side amplifier 124. The gate of IGBT 127 is coupled to an emitter of IGBT 127 and a collector of IGBT 128 via positive side amplifier 124 and power supply 131. The gate of IGBT 128 is coupled to an emitter of IGBT 128 via negative side amplifier 124 and power supply 142.

When both structures of gate-driving-circuits 9 and 109 shown in FIG. 4 and FIG. 15 respectively are compared, circuit 9 of the present invention demonstrates that power supply circuit 106 and power supply 131 may be spared by employing a charging-pump-type gate-driving-circuit. The spared elements 106 and 131, are part of conventional circuit 109, and are driven by a power supply system different from main battery 102. IGBTs 27 and 28 may thus be driven by a single power supply system belonging to main battery 2. This mechanism may also be applicable to other gate-driving-circuits.

As describe above, in the first exemplary embodiment shown in FIG. 1, the much of the inverter system is driven by a single power supply system supported by main battery 2 by using charging-pump-type gate-driving-circuit 9. In FIG. 1, the circuit-family on side "b" of the broken line is supported by main battery 2, and another circuit-family on side "a" of the broken line is supported by sub battery 3. This construction, in accordance with an embodiment of the present invention spares insulation used in circuits such as those shown in FIG. 11 and FIG. 12:

In FIG. 11 charging circuit 111, current detector 108, gate driving circuit 109, and induced voltage detector 110, may require insulation because these are supported by different power supplies.

In FIG. 12 charging circuit 211, current detector 208, gate driving circuit 209, and induced voltage detector 210, may require insulation because these are supported by different power supplies.

The circuits of the present invention, such as charging circuit 11, current detector 8, gate driving circuit 9, and induced voltage detector 10 are, on the other hand, substantially free from insulation. As a result of sparing insulation, the inverter system in accordance with an embodiment of the present invention may be smaller and less expensive.

Figure 5A:
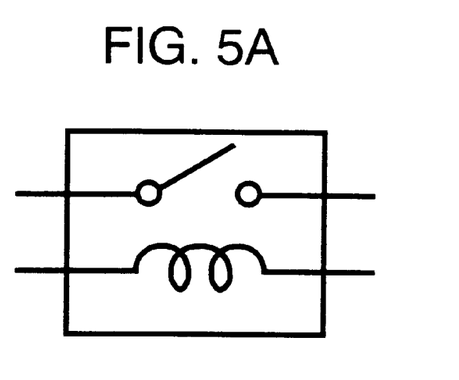
FIG. 5A and FIG. 5B illustrate the structure of a relay portion in a charging circuit used in the first exemplary embodiment of the present invention.
Figure 5B:
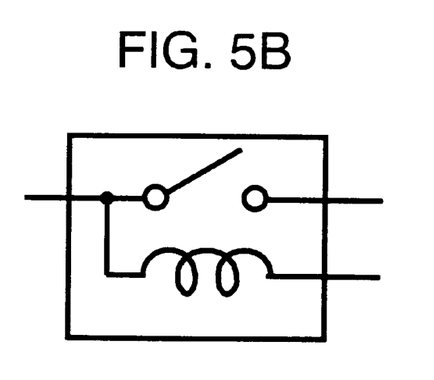

For example, FIG. 5A and FIG. 5B illustrate a relay portion of charging circuit 11 used in the first exemplary embodiment of the present invention.

Figure 16:
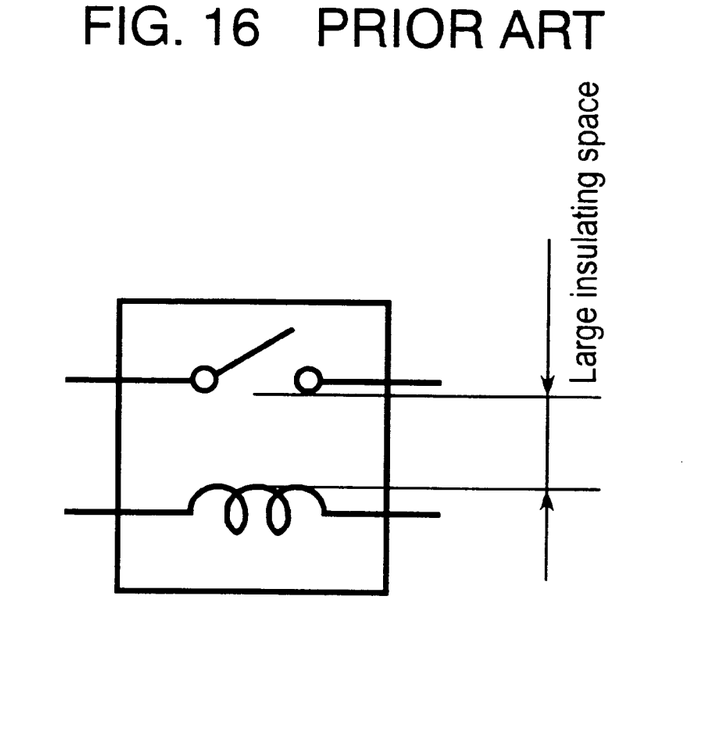
FIG. 16 illustrates a structure of a relay portion in a charging circuit used in the system shown in FIG. 11.

Both of the switch and coil are coupled to the power supply system belonging to main battery 2. FIG. 16 illustrates a relay portion of charging circuit 111 shown in FIG. 11. In FIG. 16, the switch may be coupled to a high-voltage-power-supply system belonging to main battery 102, while the coil may be coupled to a low-voltage-power-supply system belonging to sub battery 103. Distances for the purpose of insulation may thus be made smaller in the exemplary embodiment of the present invention shown in FIGS. 5A and 5B than in the arrangement shown in FIG. 16. Further as shown in FIG. 5B, the amount of wiring may be reduced.

Figure 6:
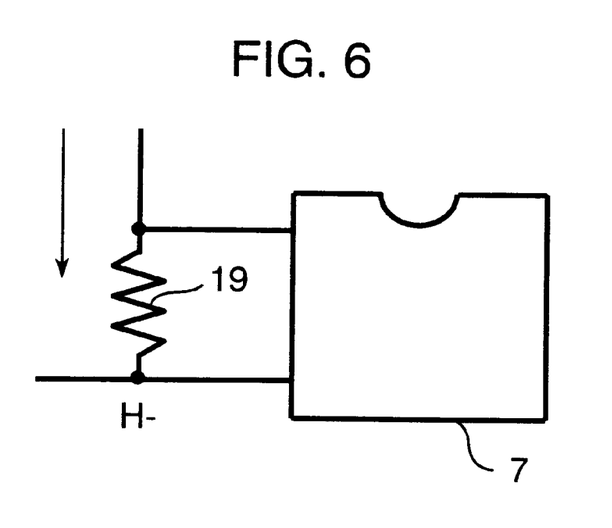
FIG. 6 illustrates the structure of a current detector used in the first exemplary embodiment of the present invention.

FIG. 6 shows current detector 8 which may be used with an exemplary embodiment of the present invention.

$\mu$ computer 7 may be coupled to power supply system belonging to main battery 2. A first terminal of shunt resistor 19 may be coupled to the power supply system. A voltage drop produced by a current running through the shunt resistor 19 may be drawn from a second terminal of resistor 19 and directed to the $\mu$ computer 7. Therefore, the current running through inverter 4 may be detected using a relatively simple construction.

Figure 17:
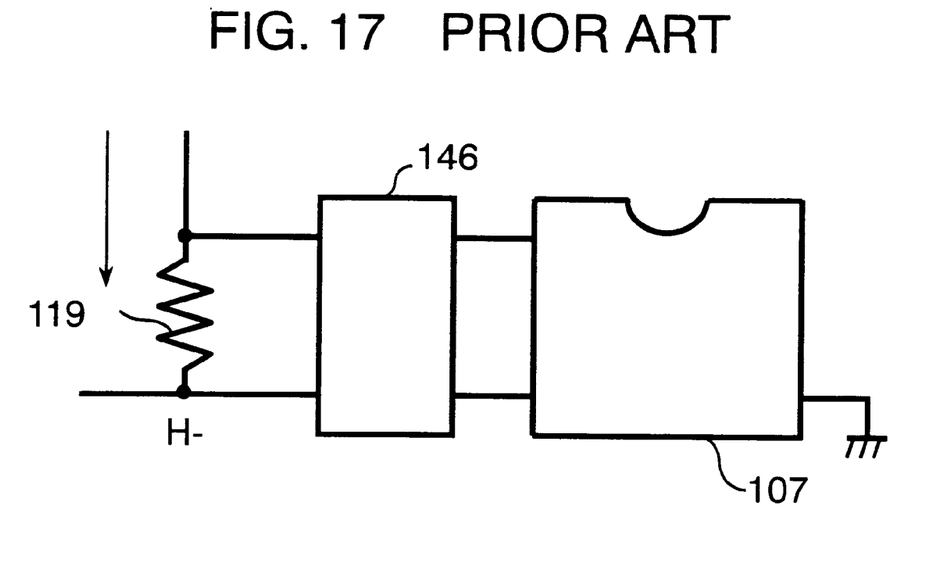
FIG. 17 illustrates a structure of a current detector used in the system shown in FIG. 11.

In current detector 108 of FIG. 11, shown in greater detail in FIG. 17, $\mu$ computer 107 may be driven by power supply circuit 106 produced by the power supply system belonging to sub battery 103. The negative terminal of $\mu$ computer 107 is grounded. One of the terminals of shunt resistor 119 is coupled to the negative terminal of main battery 102, therefore, shunt resistor 119 and $\mu$ computer 107 belong to different power supply systems. In this case, both terminals of resistor 119 may not be coupled directly to $\mu$ computer 107, as may be done in the exemplary embodiment of the present invention shown in FIG. 6. Therefore, a signal corresponding to a voltage drop produced by a current ring through shunt resistor 119 may be drawn into $\mu$ computer 107 indirectly via insulated photo coupler 146.

In the exemplary embodiment of the present invention photo coupler 146 may not be used. Further, the current may be detected directly without the coupler, and more accurate detection may result.

Figure 7:
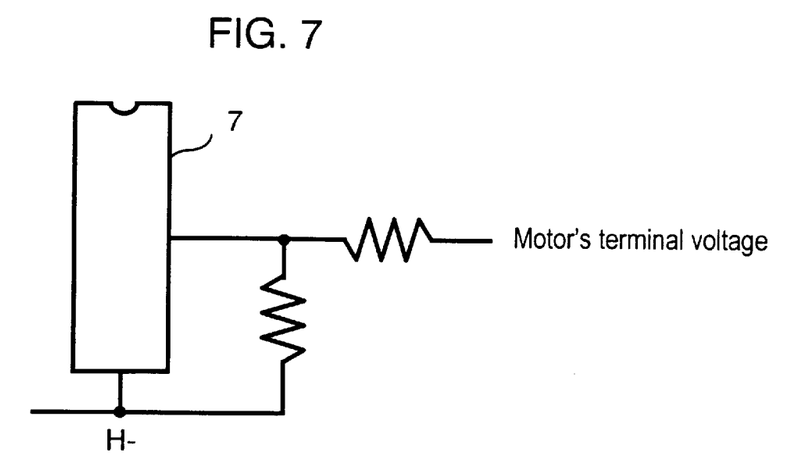
FIG. 7 illustrates the structure of an induced voltage detector used in the first exemplary embodiment of the present invention.
Figure 18:
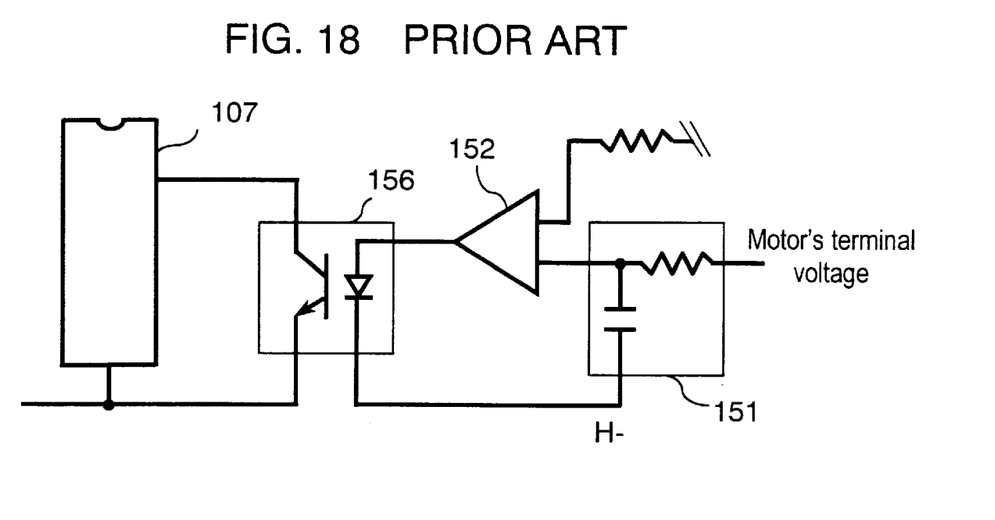
FIG. 18 illustrates a structure of an induced voltage detector used in the system shown in FIG. 11.

FIG. 7 illustrates in greater detail induced voltage detector 10 of FIG. 1, used in this exemplary embodiment of the present invention. A terminal voltage of the motor may be divided with two resistors, and the resulting divided voltage may be supplied directly to $\mu$ computer 7. In the arrangement shown in FIG. 18, the voltage of a motor is applied to CR filter 151 which belongs to the power supply system supported by main battery 111, while $\mu$ computer 107 may be driven by another power supply circuit 106 that is supported by sub battery 103. Therefore, comparator 152 is provided to compare an output voltage of CR filter 151 with a given voltage, and the comparison result should be supplied to $\mu$ computer 107 indirectly via insulated photo coupler 156.

Induced voltage detector 10 of FIG. 1 may spare the photo coupler 156 which is used in the arrangement of FIG. 28. Thus, detector 10 may detect directly an induced voltage without the coupler, and may produce a more accurate result.

An arrangement in accordance with this exemplary embodiment of the present invention may also produce power savings with respect to supply circuit 106 shown in FIG. 11 or supply circuit 206 in FIG. 12.

Figure 2:
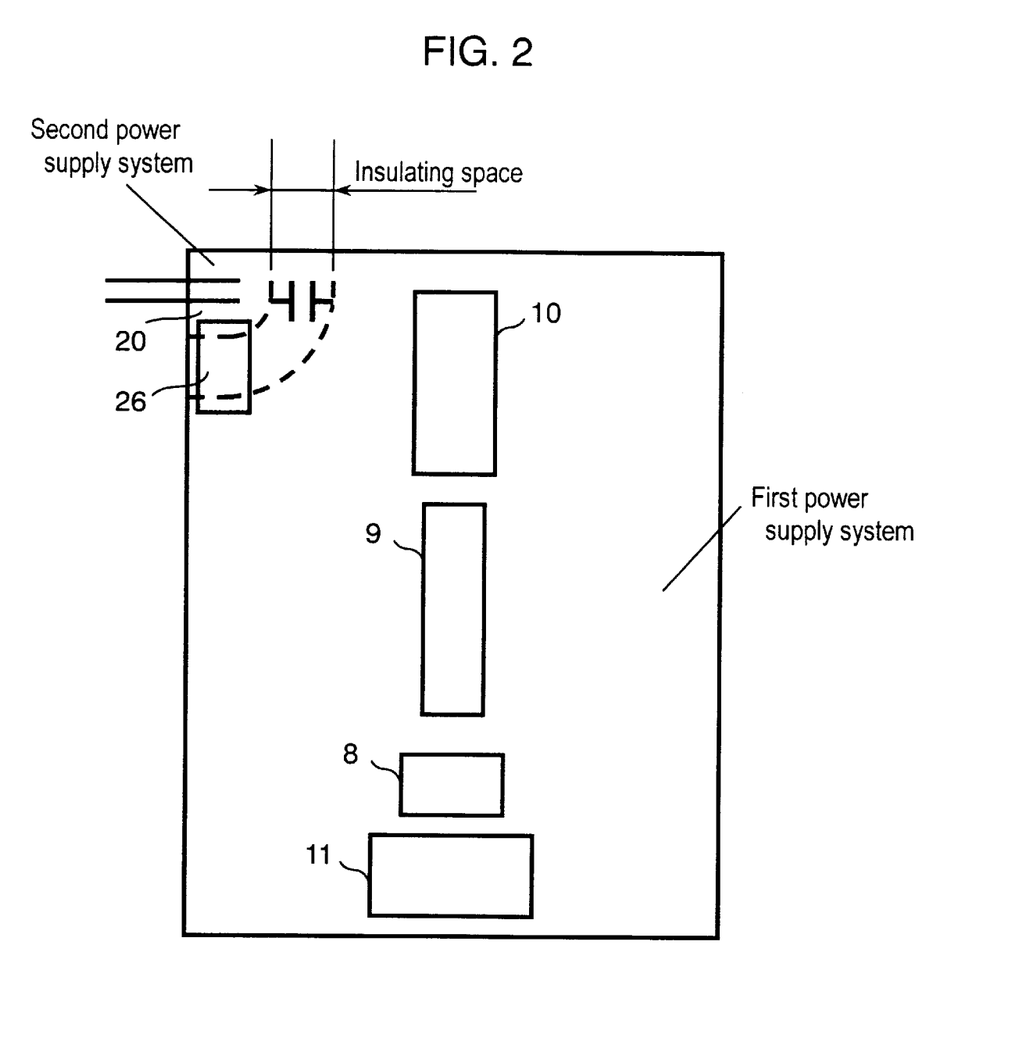
FIG. 2 is a schematic diagram of a PWA of an inverter used in the first exemplary embodiment of the present invention.

FIG. 2 depicts a downsized PWA (printed wired assembly board) used in accordance with the arrangement of this exemplary embodiment. The components in the circuit-family driven by the first power supply system belonging to main battery 2, such as current detector 8, gate-driving-circuit 9, induced voltage detector 10, and charging circuit 11, may be separated by relatively narrow spaces. Therefore, these components may be densely placed in the PWA. Photo coupler 26 may be placed between the first and the second power supply systems as an insulator in order to operate insulating communication circuit 20. Typically, a relatively large space is desirable for insulating the first and the second power supply systems. The PWA per se, however, may require only few portions that may need such relatively large insulating space. Therefore, the downsizing of the PWA may not be adversely affected.

In the arrangement shown in FIG. 11 (FIG. 12), current detector 108 (208), gate-driving-circuit 109 (209), induced voltage detector 110 (210), and charging circuit 111 (211) are coupled to both of the first and second power supply systems. Therefore, substantially large spaces for insulation may be required in between. As a result, the PWA used in arrangement of FIG. 11 may be obliged to be relatively large as shown in FIG. 13.

In other words, a PWA in accordance this exemplary embodiment of the present invention saves space that may have been required in conventional arrangement for insulating a two power supply system. This exemplary embodiment may only reserve space for insulating communication circuit 20. Further, each component and circuit may be downsized respectively, which also contributes to a substantial downsizing of the PWA.

Figure 8:
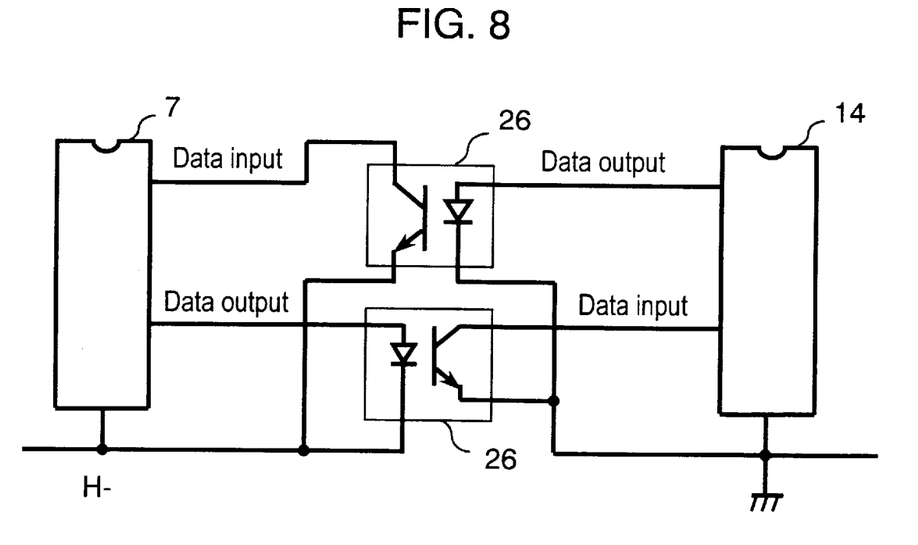
FIG. 8 illustrates a structure of an insulating communication circuit used in the first exemplary embodiment of the present invention.

FIG. 8 is a circuit diagram of insulating communication circuit 20 which insulates between the different power supply systems.

Figure 19:
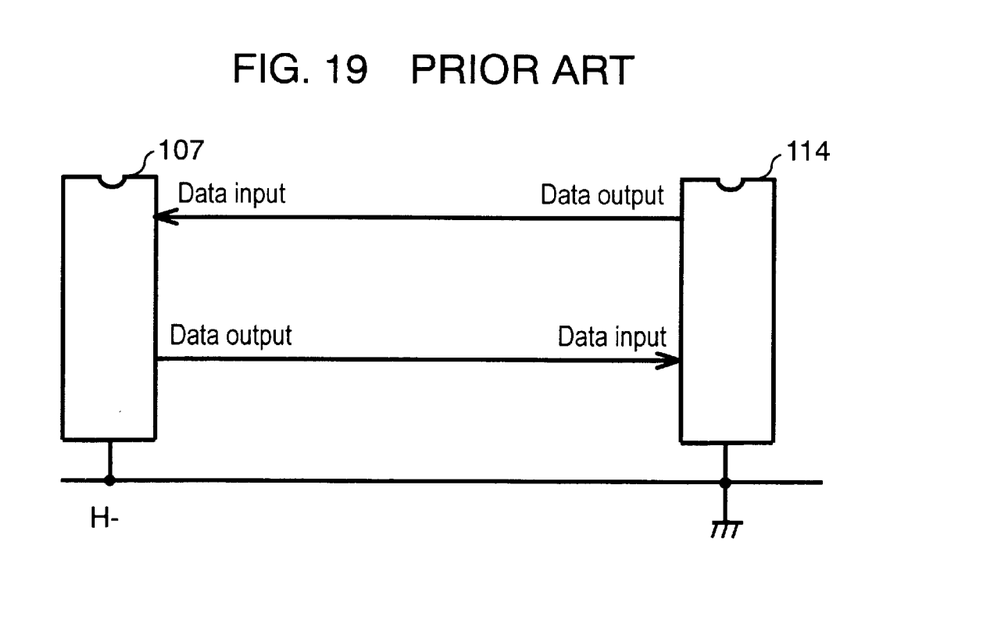
FIG. 19 is a schematic diagram of communication wiring used in the system shown in FIG. 11.

The arrangement shown in FIG. 19, on the other hand, requires no insulating. Considering, however, the foregoing discussion, it may still be the case that an arrangement in accordance with this exemplary embodiment may achieve downsizing and cost reduction with respect to the arrangement of FIG. 19.

Inverter temperature detector 12 and compressor temperature detector 13 used in accordance with this exemplary embodiment of the present invention are described with reference to FIG. 1.

In conventional arrangements, these temperature detectors are often placed at an enclosure. For instance, in a car-mounted inverter system, the inverter temperature detector may be disposed at a heat dissipation sink in order to detect a temperature of switching elements. A compressor temperature detector is often disposed at a compressor enclosure. The heat sink and compressor enclosure are electrically coupled to the body of a car. Therefore, such an arrangement may be disadvantageous with respect to insulation strength between the enclosure/sink/car body and the main battery, if these detectors were to be directly driven by the main battery (high voltage). In other words, it may be disadvantageous for the main battery, which supplies a high voltage, to be physically close to the enclosure/sink/car body.

Considering the above possible disadvantage, inverter temperature detector 12 may be placed, for example, in a power module where switching-element group 4, which is supported by the main battery 2, is mounted. Compressor temperature detector 13 may be placed near the coil of the motor driven by main battery 2. This arrangement helps to ensure a degree of safety (as in conventional arrangements), but allows these detectors to be placed nearer to the heat sources, i.e. the switching elements and the coil of the motor. As a result, the respective temperatures may be detected with greater accuracy.

In addition to the above novelties, the attention is also paid to safety in this exemplary embodiment. In FIG. 1, some of the wirings of the circuit-family supported by main battery 2 lead outside of inverter 1. For example, wiring 313 to compressor temperature detector 13 and wiring 311 to charging circuit 11. Wiring 313 may be bundled with three-phase-output wiring between switching-element-group 4 and compressor 5. Wiring 311 may be bundled with power-supply-input wiring from main battery 2. These two resultant bundled wirings may be further bundled together and covered with a protection tube so that the resultant single bundled wiring may be routed within the body of a car. This attention to the wiring keeps safety a level comparable to that found in conventional arrangements.

The present invention help to relieve electromagnetic noise. This effect is described hereinafter with reference to FIG. 3.

Figure 3:
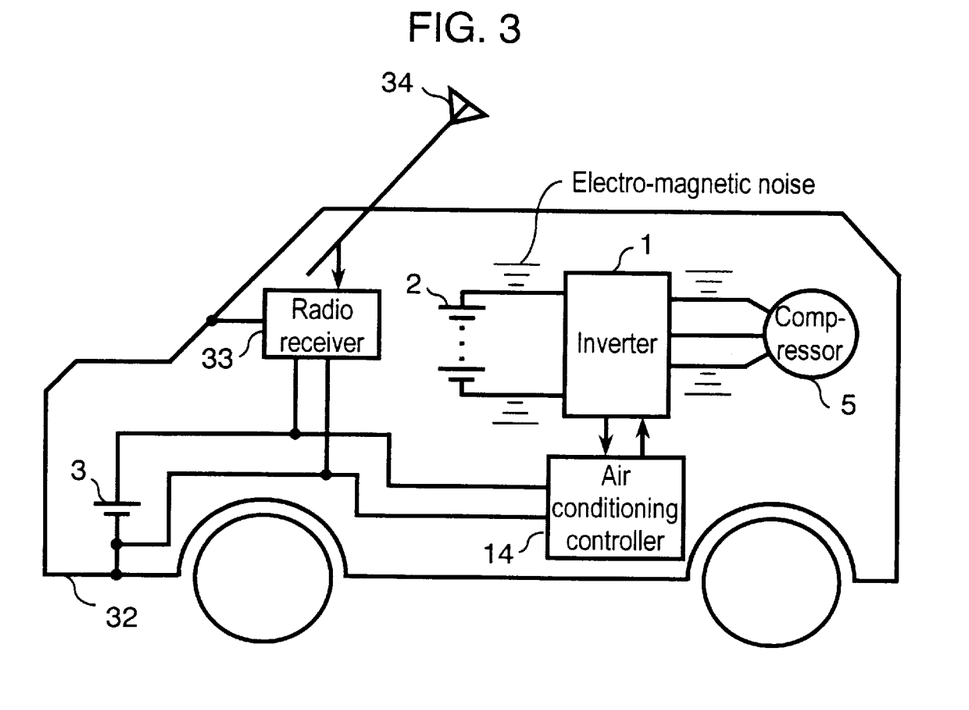
FIG. 3 is a schematic diagram illustrating an air-conditioning inverter system, mounted in an electric vehicle, in accordance with an exemplary embodiment of the present invention.

FIG. 3 depicts an example where an arrangement in accordance with this exemplary embodiment of the present invention is used in an electric vehicle. Main battery 2 is generally not grounded to car body 32, while the negative terminal of sub battery 3 may be grounded to the car body 32. Car-mounted devices, such as radio receiver 33 and air conditioning controller 14, are supported by sub battery 3. A grounding terminal of antenna 34 of radio receiver 33 may be connected to car body 32. Inverter 1 may be powered only by main battery 2. Inverter 1 may communicate with air conditioning controller 14, and insulation is provided therebetween. A power supply wiring of sub battery 3 may not be routed into inverter 1.

FIG. 14 depicts a conventional example where an inventor is used in an electric vehicle. Main battery 102 is generally not grounded to car body 132, while the negative terminal of sub battery 103 is grounded to the car body. Car-mounted devices, such as radio receiver 133 and air conditioning controller 114, may be supported by sub battery 103. A grounding terminal of antenna 134 of radio receiver 133 may be connected to car body 132. Inverter 101 communicates with air conditioning controller 114. Inverter 101 is powered, in contrast with the arrangement of the exemplary embodiment of the present invention, by both main battery 102 and sub battery 103.

As shown in FIG. 3, in the arrangement of the exemplary embodiment of the present invention, because the power line of sub battery 3 is not routed into inverter 1, stray capacitance between circuit-families on the PWA may be less than that in the arrangement shown in FIG. 14. Thus, noises produced by inverter 1 do not tend to ride on the wiring. As a result, a transmission-noise-level in the circuit-family belonging to sub-battery 3 is lowered. In conventional arrangements, this transmission noise may adversely affects the power line of the sub battery and may produce radiation noise. Therefore, the radiation noise may also be decreased by the present invention.

The transmission noise and the radiation noise to the power line of main battery 2 may be at a comparable level to conventional arrangements, however, it may be easier to take measures against these noises in the arrangement according to the present invention as compared with conventional arrangements. It may be easier to take such measures in an arrangement according to the present invention because these measures are taken for two power supply systems in a conventional arrangement, while these measures are taken for one power supply in arrangements in accordance with the present invention.

(Exemplary Embodiment 2)

Figure 9:
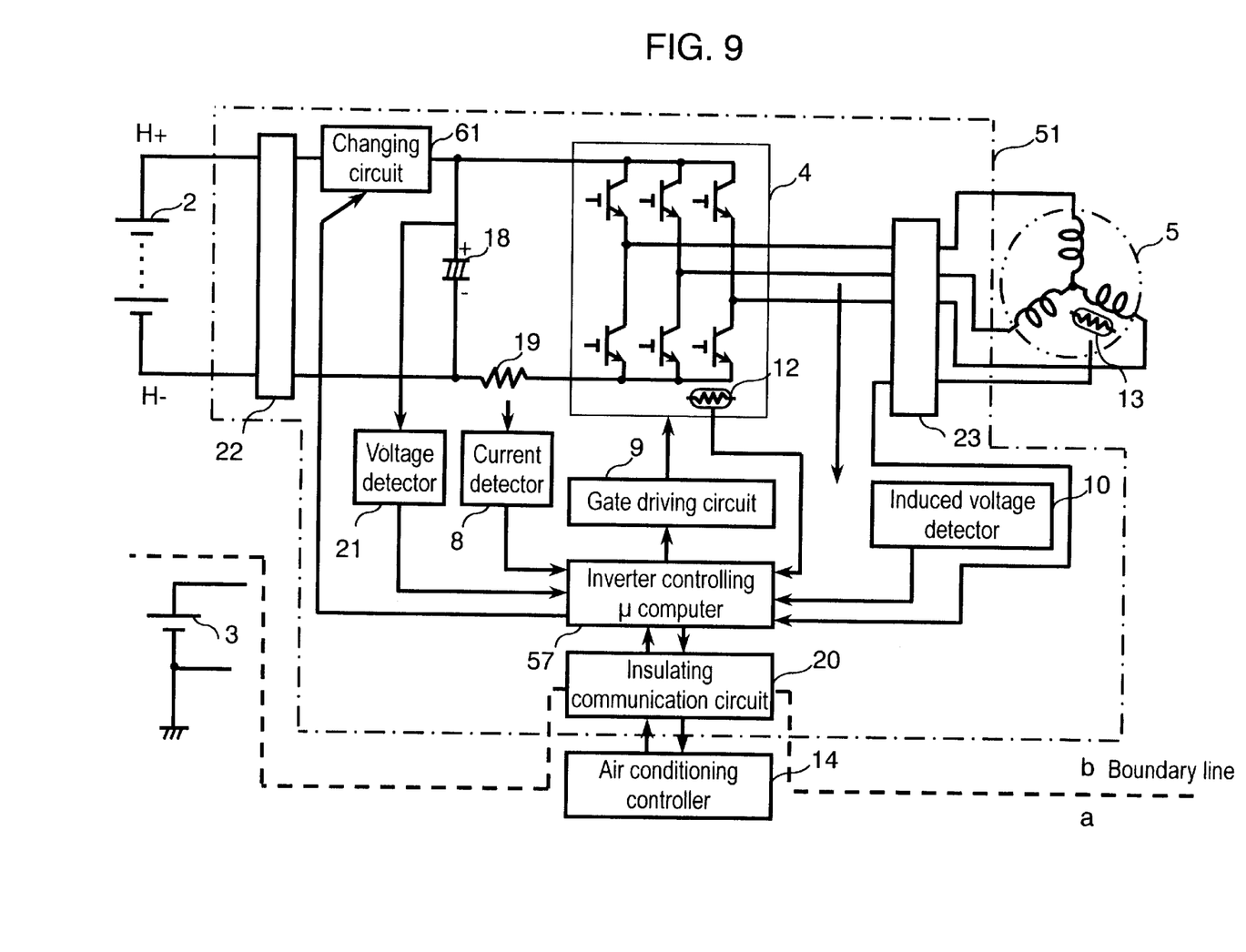
FIG. 9 is a schematic diagram of an inverter system in accordance with a second exemplary embodiment of the present invention.

FIG. 9 is a schematic diagram of an inverter system in accordance with a second exemplary embodiment of the present invention in which measures against noises to power lines of main battery 2 have been taken. The differences between second exemplary embodiment of the present invention and the first exemplary embodiment are discussed below.

Noise filter 22 is provided at an inlet through which both positive and negative power lines may be routed into an inverter 51. Another noise filter 23 is provided at an outlet through which three-phase coils of a motor, incorporated in compressor 5, and a terminal of compressor temperature detector 13 may be routed outside inverter 51. Further, charging circuit 61 is incorporated in inverter 51. Noise filters 22 and 23 may remove inverter noise produced by switching operation of switching-element-group 4, as well as clock noises due to the operation of $\mu$ computer 57.

Voltage detector 21 may be provided in order to improve the performance of the inverter. In conventional arrangements, when voltages of a circuit family supported by the main battery are detected (for inputting the detected values into the $\mu$ computer), because the 9 computer belongs to another circuit-family supported by the sub battery, the two circuit-families are insulated. Thus, it may be difficult to accurately detect voltages. In an arrangement according to this exemplary embodiment, a voltage may be divided with two resistors as shown in FIG. 7. The divided voltage may than be directly supplied to the $\mu$ computer.

Therefore, a voltage signal of the circuit-family supported by main battery 2 may be supplied to the $\mu$ computer 57 with relative ease. $\mu$ computer 57 may process data using this voltage signal. Thus, this arrangement may contribute to the improvement of performance of the inverter system.

(Exemplary Embodiment 3)

Figure 10:
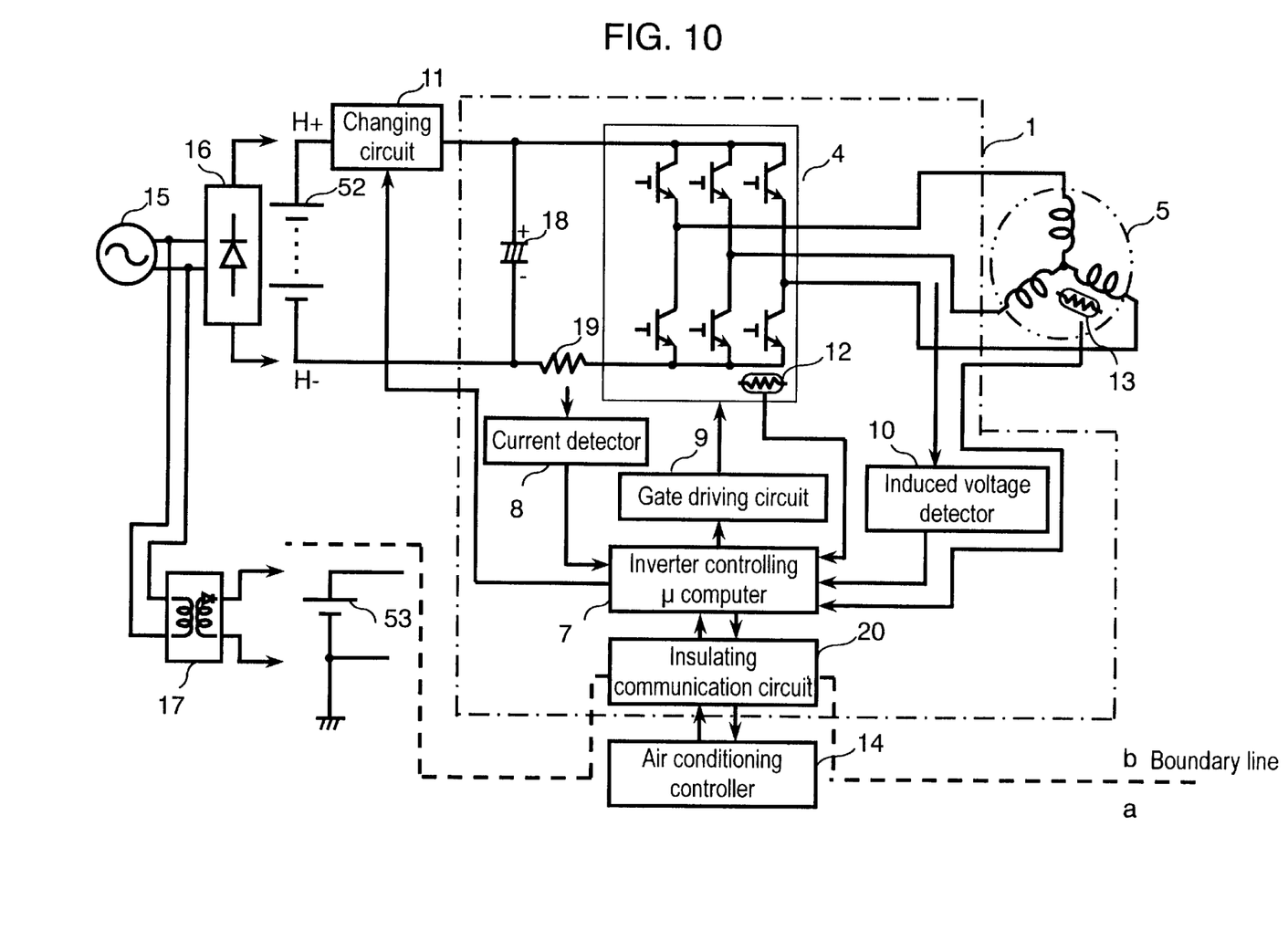
FIG. 10 is a schematic diagram of an inverter system in accordance with a third exemplary embodiment of the present invention.

FIG. 10 is a schematic diagram of an inverter system in accordance with a third exemplary embodiment of the present invention, in which an inverter is mounted to a home-use air conditioner. The difference between the third exemplary embodiment of the present invention and the first exemplary embodiment are discussed below. Main power supply 52 is a dc voltage produced from commercial power source 15, i.e. commercial power source 15 is rectified using rectifying diode 16, and then smoothed, for example, using a capacitor (not shown) into a dc voltage. Sub power supply 53 is a secondary insulated dc voltage produced from commercial power source 15, i.e. commercial power source 15 is insulated and reduced using an isolation transformer 17. Sub power supply 53 may support air conditioning controller 14 and insulating communication circuit 20.

The third exemplary embodiment can produce the same effect as the first exemplary embodiment.

According to the present invention, since all the circuits in an inverter except an insulating communication circuit are supported by a first power supply system, spaces and costs involved in insulating one circuit-family from another, supported by respective power supplies, may be saved. Stray capacitance between the first and second power supply systems may be reduced, whereby interference due to electromagnetic noise may also be reduced. As a result, other systems and circuits also mounted to the same apparatus such as, for example, a car, or an air-conditioner may be subjected to less electromagnetic noise. The present invention thus may provide an excellent inverter system.

As the compressor temperature detector may be disposed close to the coils of the motor, an accurate temperature may be detected while securing safety.

When the inverter system for air conditioning is mounted to a vehicle, car-mounted devices such as, for example, a radio receiver and the like which are grounded to the apparatus body, may be subjected to less electromagnetic-noise-interference provided the first power supply is insulated from the second power supply (which is also grounded to the apparatus body).

The present invention may be applicable not only to air-conditioning inverter systems for an air conditioner and a car air-conditioner, but also to an inverter system for driving motors employed in various industrial apparatus. For example, FA apparatus, home appliances, and information apparatus may be implemented in accordance with the present invention. Hence, the present invention may have great industrial value.

While in the foregoing there have been described embodiments of the present invention, it should be understood by those skilled in the art that various modifications and changes can be made without departing from the true spirit and scope of the present invention.

What is claimed is:

1. An inverter system comprising:
   a first power supply having a positive side and a negative side;
   a motor;
   a plurality of switching elements including:
   a first plurality of switching elements, coupled to the positive side of the first power supply, forming a positive side arm, and
   a second plurality of switching elements, coupled to the negative side of the first power supply, forming a negative side arm;
   a gate-driving circuit, supported by the first power supply, for selectively driving one of the first plurality of switching elements of the positive side arm and one of the second plurality of switching elements of the negative side arm responsive to a control signal;
   an inverter controller, supported by the first power supply, for controlling the motor via the control signal;
   a second power supply;
   an outer controller supported by the second power supply; and
   an insulating communication circuit providing communication between the inverter controller and the outer controller.

2. The inverter system of claim 1, further comprising an electric compressor incorporating the motor.

3. The inverter system of claim 1, further comprising a temperature detector for detecting a temperature of a coil of said motor, wherein said temperature detector is driven by said first power supply.

4. The inverter system of claim 2, further comprising a temperature detector for detecting a temperature of a coil of said motor, wherein said temperature detector is driven by said first power supply.

5. The inverter system of claim 1, wherein the first power supply and the second power supply are insulated from each other.

6. The inverter system of claim 2, wherein the first power supply and the second power supply are insulated from each other.

7. The inverter system of claim 3, wherein the first power supply and the second power supply are insulated from each other.

8. The inverter system as defined in claim 4, wherein the first power supply and the second power supply are insulated from each other.

9. An inverter system comprising:
   a first power supply having a positive side and a negative side;
   a motor;
   a plurality of switching elements including:
   a first plurality of switching elements, coupled to the positive side of the first power supply, forming a positive side arm, and
   a second plurality of switching elements, coupled to the negative side of the first power supply, forming a negative side arm;
   a gate-driving circuit, supported by the first power supply, for selectively driving one of the first plurality of switching elements of the positive side arm and one of the second plurality of switching elements of the negative side arm responsive to a control signal;
   an inverter controller, supported by the first power supply for, controlling the motor via the control signal;
   a secondary insulated power supply derived from the first power supply;
   an outer controller supported by the secondary insulated power supply; and
   an insulating communication circuit providing communication between the inverter controller and the outer controller.

10. The inverter system of claim 9, further comprising an electric compressor incorporating the motor.

11. The inverter system of claim 9, further comprising a temperature detector for detecting a temperature of a coil of said motor, wherein said temperature detector is driven by said first power supply.

12. The inverter system of claim 10, further comprising a temperature detector for detecting a temperature of a coil of said motor, wherein said temperature detector is driven by said first power supply.

13. The inverter system of claim 10, wherein said inverter system is mounted to an air conditioner.

14. The inverter system of claim 12, wherein said inverter system is mounted to an air conditioner.

15. The inverter system of claim 6, wherein said inverter system is mounted to an air conditioner.

16. The inverter system of claim 8, wherein said inverter system is mounted to an air conditioner.

17. The inverter system of claim 2, wherein said inverter system is mounted to a vehicle.

18. The inverter system of claim 15, wherein the second power supply is grounded to a vehicle body which is equipped with the air conditioner.

19. The inverter system of claim 16, wherein the second power supply is grounded to a vehicle body which is equipped with the air conditioner.

20. The inverter system of claim 3, further comprising:
   first noise filter provided between the first power supply and the plurality of switching elements, the gate driving circuit, and the inverter controller;
   a second noise filter provided between the plurality of switching elements and the coil of the motor as well as between the inverter controller and the temperature detector.

* * * * *